US006480888B1

(12) United States Patent
Pedersen

(10) Patent No.: US 6,480,888 B1
(45) Date of Patent: Nov. 12, 2002

(54) VIRTUAL PATH CONCENTRATOR NODE WITH LOOPBACK

(75) Inventor: John L. Pedersen, Aberdeen, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/221,854

(22) Filed: Dec. 29, 1998

(51) Int. Cl.$^7$ ............................................. G06F 15/16
(52) U.S. Cl. ...................................... 709/218; 709/223
(58) Field of Search ............................... 709/249, 245, 709/217, 218, 222, 223, 227, 242; 370/403, 401, 60, 260, 219, 256, 397, 247, 222, 395; 713/201; 345/335

(56) References Cited

U.S. PATENT DOCUMENTS

| | | | | |
|---|---|---|---|---|
| 5,550,816 A | * | 8/1996 | Hardwick et al. | 370/60 |
| 5,590,281 A | * | 12/1996 | Stevens | 709/227 |
| 5,818,842 A | * | 10/1998 | Burwell et al. | 370/397 |
| 5,892,924 A | * | 4/1999 | Lyon et al. | 709/245 |
| 5,963,556 A | * | 10/1999 | Varghese et al. | 370/401 |
| 5,964,841 A | * | 10/1999 | Rekkter | 709/242 |
| 5,968,176 A | * | 10/1999 | Nessett et al. | 713/201 |
| 6,101,166 A | * | 8/2000 | Baldwin et al. | 370/222 |
| 6,101,188 A | * | 8/2000 | Sekine et al. | 370/401 |
| 6,111,858 A | * | 8/2000 | Greaves et al. | 370/256 |
| 6,266,056 B1 | * | 7/2001 | Kanungo | 345/335 |
| 6,269,082 B1 | * | 7/2001 | Mawhinney et al. | 370/247 |
| 6,298,377 B1 | * | 10/2001 | Hartikainen et al. | 709/223 |
| 6,393,468 B1 | * | 5/2002 | McGee | 790/218 |

OTHER PUBLICATIONS

Schoen et al, Convergence Between Public Swithcing and the Internet, IEEE 1998.*
Narvaez et al, New Techniques for Regulating TCP Flow over HEternogeneous Networks, IEEE 1998.*
Fibre Channel: Tutorial and Resources, www.iol.unh.edu/training/fc/fc_tutorial.html,May 1998.*
Carbone, Preliminary Network Performance Study of a Windows NT ATM Network,www.odyssea.com/WHATs_NEW/ntatmnet/ntatm.*
Zhang et al, Performance Evaluation of Rate Based Congestioon Control Schemes for ABR Service over Broadband Satellite Networks Interworking with ATM/B–ISDNs, IEEE 1997.*
Agrawal et al, A testbed for Mobile Networked Computing, IEEE 95.*

* cited by examiner

Primary Examiner—Mark H. Rinehart
Assistant Examiner—Thong Vu

(57) ABSTRACT

A virtual path concentrator node provides concentration and savings in virtual path connection count in an interworked network. The virtual path concentrator node is coupled between an access node and a gateway node of a first network that interfaces to a second network of an interworked network which interface one another via a network to network interface. A plurality of permanent virtual circuit connections in the first network may be reduced and concentrated into a fewer number of virtual paths out of the virtual path concentrator node. A loopback arrangement ensures, in one embodiment, virtual path identifier (VPI) identification of a frame relay, or in another embodiment, an asynchronous transfer mode network address compatibility within the interworked network.

19 Claims, 14 Drawing Sheets

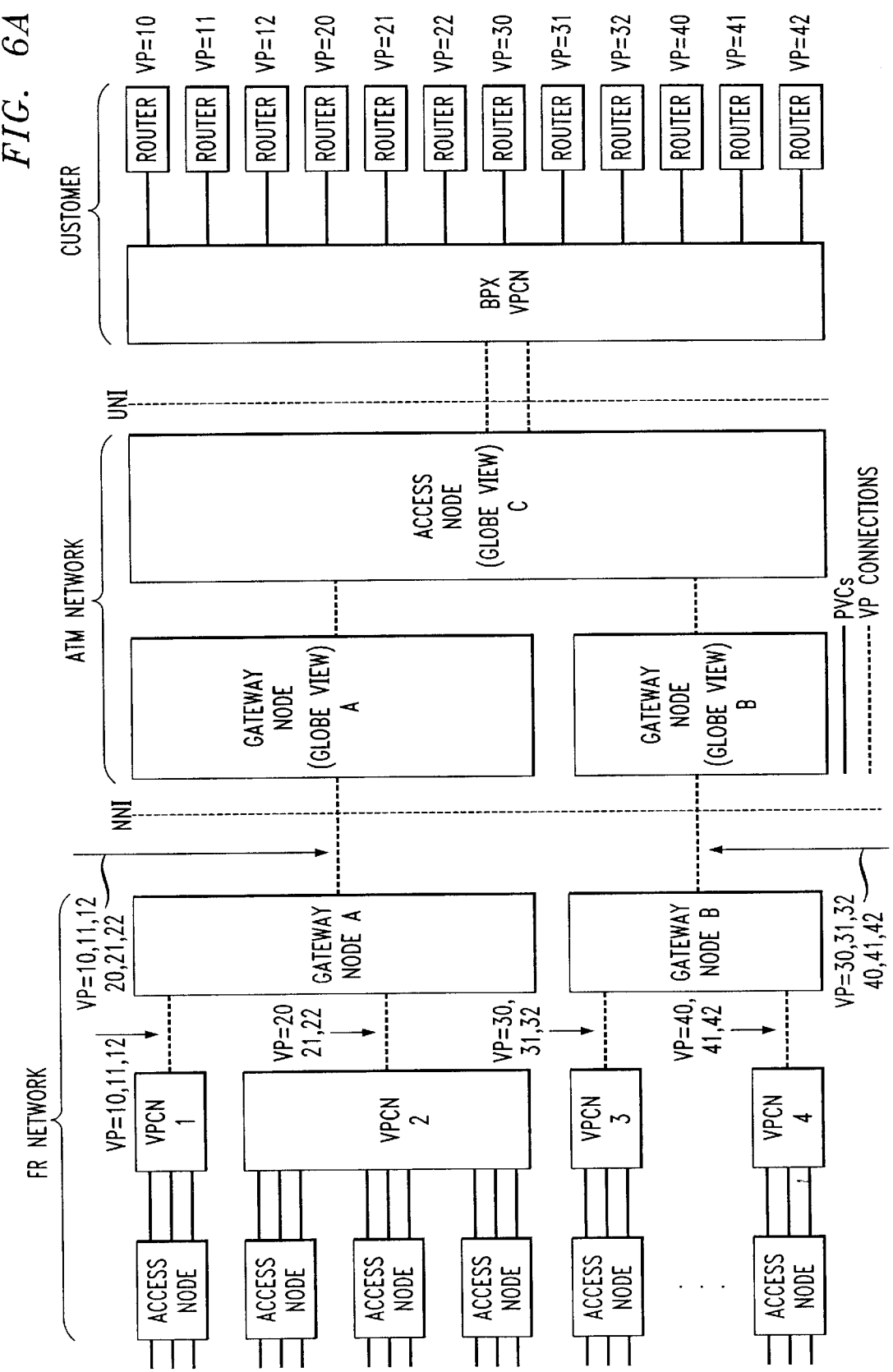

○ AXIS/FRSM  ——— VCC SEGMENT (AXIS/BPX INTERNAL)
● AXIS/BNM  ——— PHYSICAL TRUNK CARRYING VCCs
● VPCN FEEDER TRUNK CARD  ---------- PHYSICAL NNI PORT LOOPBACK
● VPCN NNI PORT CARD  ············ VPC SEGMENT (BPX INTERNAL)
▓ VPCN ROUTING TRUNK CARD  ——— PHYSICAL TRUNK CARRYING VPCs
■ BPX (NON-VPCN) ROUTING TRUNK CARD [USE OF NON-VPCN ROUTING CORE IS OPTIONAL.]

FIG. 8A

| STANDARD ATM UNI CELL HEADER | | | | | | | |
|---|---|---|---|---|---|---|---|
| 8 | 7 | 6 | 5 | 4 | 3 | 2 | 1 |
| GFC | | | | VPI | | | |
| VPI | | | | VCI | | | |
| VCI | | | | | | | |
| VCI | | | PTI | | | C | |
| HEC | | | | | | | |

GFC – GENERAL FLOW CONTROL
VPI – VIRTUAL PATH IDENTIFIER
VCI – VIRTUAL CIRCUIT IDENTIFIER
PTI – PAYLOAD TYPE INDICATOR
C – CELL LOSS PRIORITY (CLP) BIT
HEC – HEADER ERROR CONTROL

FIG. 8B

| STANDARD ATM NNI CELL HEADER | | | | | | | |
|---|---|---|---|---|---|---|---|
| 8 | 7 | 6 | 5 | 4 | 3 | 2 | 1 |
| VPI | | | | | | | |
| VPI | | | | VCI | | | |
| VCI | | | | | | | |
| VCI | | | PTI | | | C | |
| HEC | | | | | | | |

FIG. 9

| | 12 | 11 | 10 | 9 | 8 | 7 | 6 | 5 | 4 | 3 | 2 | 1 |
|---|---|---|---|---|---|---|---|---|---|---|---|---|
| VPI: | 0 | 0 | 0 | 0 | 0 | 0 | 0 | 0 | 0 | 0 | 0 | 0 |

| SPI |←———— GDI ————→| P/S |

00 = ATM            RANGE: 0 – 511            0 = PRI
01 = FR                                        1 = SEC
10 = RES.
11 = RES.

FIG. 10

| IDENTIFIER LIMIT | GDI (DECIMAL) | GDI (BINARY) | G-VPI (DECIMAL) | G-VPI (BINARY) |
|---|---|---|---|---|
| MINIMUM ATM GDI (PRIMARY PATH) | 0 | 000000000 | 0 | 000000000000 |
| MINIMUM ATM GDI (SECONDARY PATH) | 0 | 000000000 | 1 | 000000000001 |
| MAXIMUM ATM GDI (PRIMARY PATH) | 511 | 111111111 | 1022 | 001111111110 |
| MAXIMUM ATM GDI (SECONDARY PATH) | 511 | 111111111 | 1023 | 001111111111 |
| MINIMUM FR GDI (PRIMARY PATH) | 0 | 000000000 | 1024 | 010000000000 |
| MINIMUM FR GDI (SECONDARY PATH) | 0 | 000000000 | 1025 | 010000000001 |
| MAXIMUM FR GDI (PRIMARY PATH) | 511 | 111111111 | 2046 | 011111111110 |
| MAXIMUM FR GDI (SECONDARY) | 511 | 111111111 | 2047 | 011111111111 |

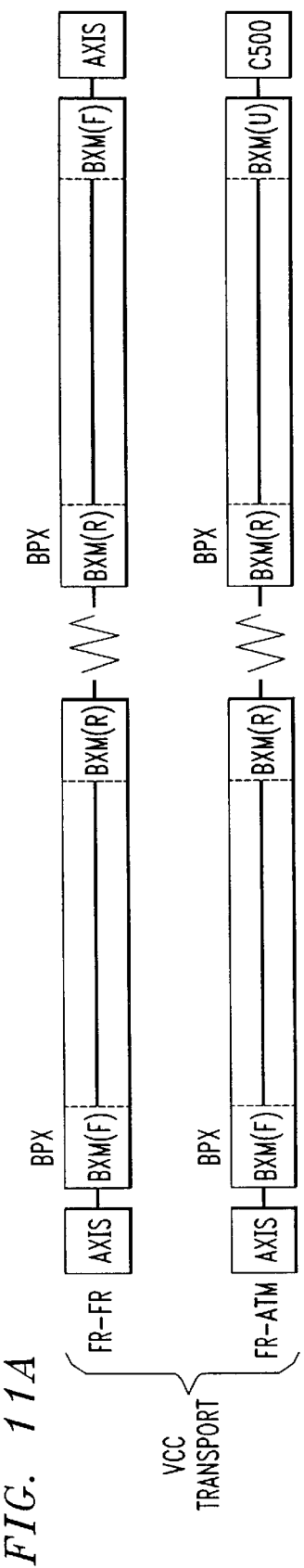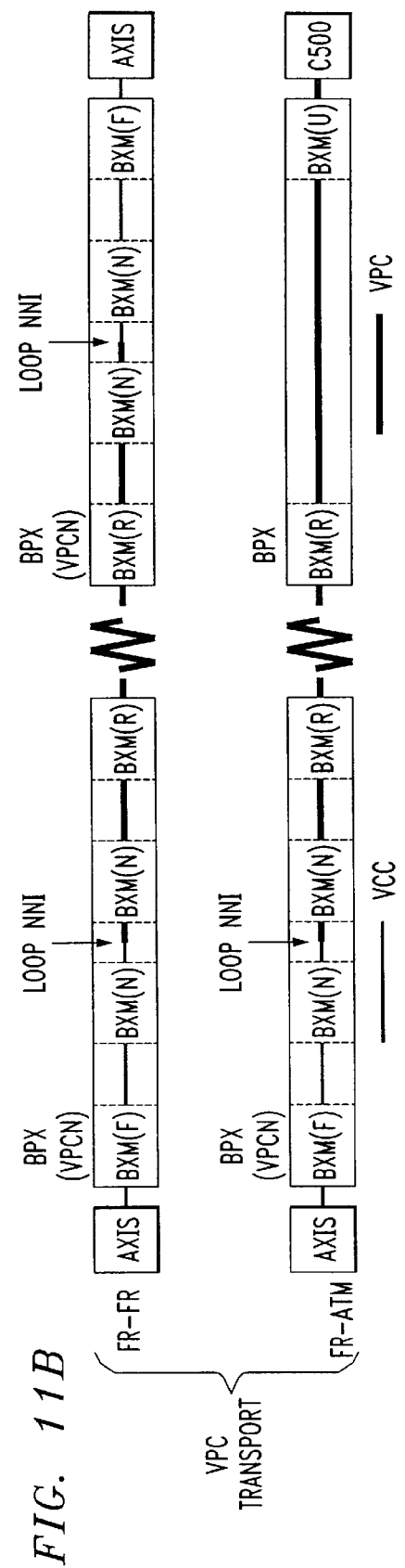
FIG. 11A
FIG. 11B
BXM(F) = FEEDER TRUNK CARD
BXM(N) = NNI PORT CARD
BXM(U) = UNI PORT CARD
BXM(R) = ROUTING TRUNK CARD
NOTE: MIXED MODE BXM CARD CONFIGURATION (SCHEDULED FOR R9.2) WILL PERMIT ONE BXM CARD TO SUPPORT ENTIRE VCC/VPC PATH (e.g. F−>N−>N−>R) THROUGH BPX

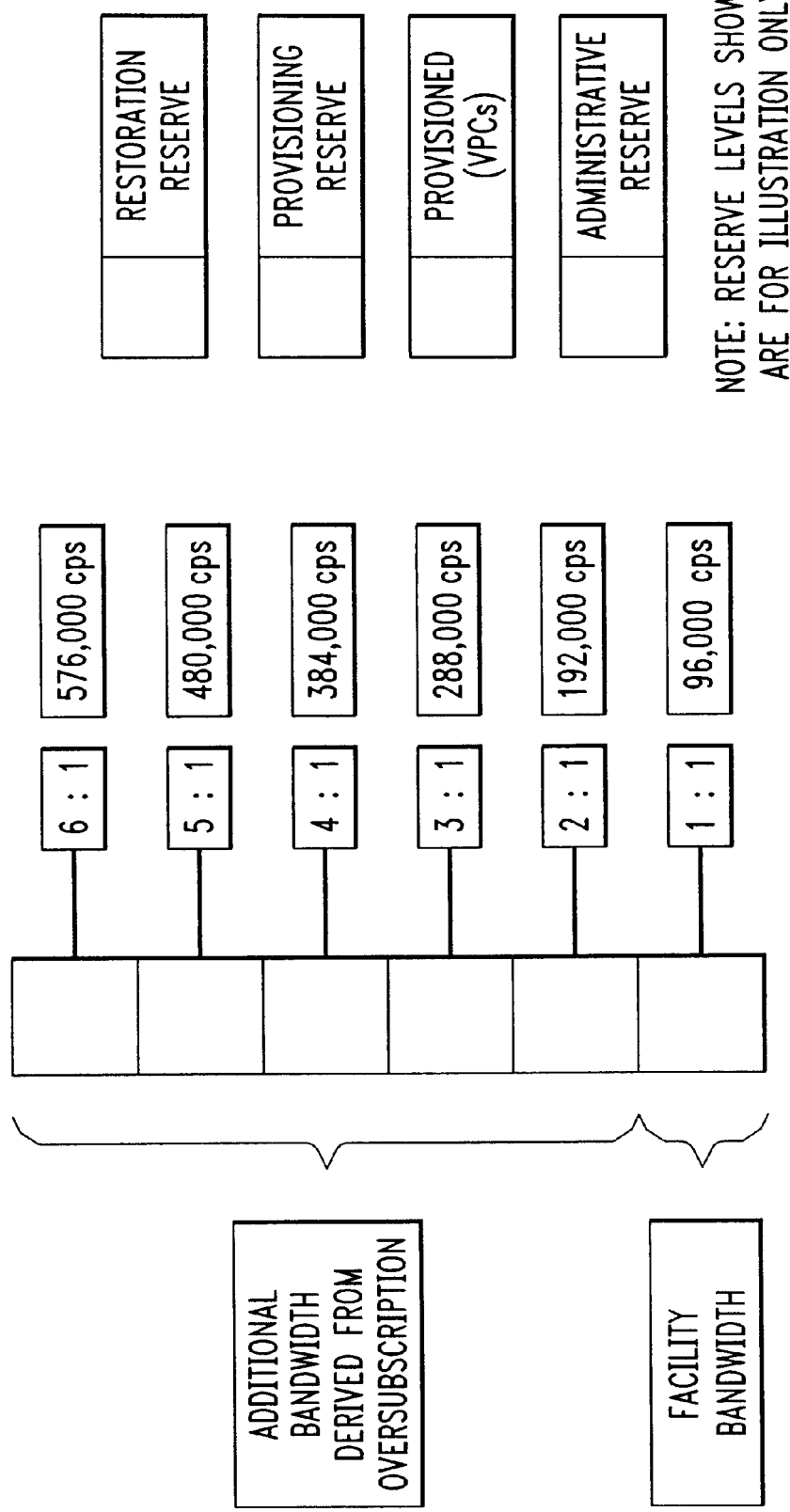

VIRTUAL PATH CONCENTRATOR NODE WITH LOOPBACK

BACKGROUND OF THE INVENTION

The present invention relates to the field of interworked networks such as coupled asynchronous transfer mode networks and frame relay networks and to providing improved concentration and efficiency in such networks via deployment in an interworked network of a loopback arrangement of a virtual path concentrator node.

In interworked networks, frequently a high speed central network, for example, an asynchronous transfer mode (ATM) network, the interworked network provides high-speed interconnection for a large number of slower remote ports, for example frame-relay (FR) ports. Referring to FIG. 1, a number of FR ports are tied through permanent virtual connections (PVC) and a network to network interface (NNI) to an ATM network. The virtal circuits (VCs) terminate at an ATM port. The ATM network forms virtual paths (VP) that tie together remote ports throughout the ATM network.

FIG. 1 illustrates the general case of two networks, Networks A and B, connected via NNI ports according to the prior art. Each of the depicted Networks A and B has a set of access nodes or switches (AS) providing connectivity to customer premises equipment (CPE), not shown, of various customers. For example, Network A comprises Access Nodes 101-1 to 101-N coupled to the left to customer premises equipment (not shown). Each network also has gateway switches (GS) which host the NNI ports used for routing of internetwork connections. For example, Network A shows AS's 101-1 to 101-5 connected via PVC's, shown as solid lines, to gateway switch 105-1 and AS 101-N connected via three PVC's to GS 105-3. Additional switches (not shown) may serve as routing nodes between the access and gateway nodes. The categorization of node types (access, routing, gateway) is only for clarity of presentation. Any switch can concurrently provide all three functions.

As depicted, a PVC may couple an AS of network A via a GS, an NNI port and a GS of Network B to an AS of Network B. Each PVC is provisioned as multiple segments. A segment is shown in network A leading from access node (AS) to gateway (GS) of Network A. A companion segment is provisioned in network B from access node (AS) to gateway (GS) of Network B. The NNI ports of each network are connected directly together in order to provide end-to-end connectivity between network A and network B access points.

The NNI ports may have two provisioning limitations: total assigned bandwidth and connection count. Although the bandwidth of a port is fixed, total assigned bandwidth is generally a "soft" limit as ports can be overbooked when adequate traffic management mechanisms allow it. That is, although a port may only offer (for the case of DS3) 36 MHZ of payload bandwidth, a total of 72 MHZ worth of PVCs may be provisioned on the port if they have utilization factors of less than 50 percent.

The connection count limit, however, is a "hard" limit stemming from the port card design. If a port is limited to, for example, 1000 connection terminations, that limit will prevent further provisioning on the port irrespective of the bandwidth utilization.

For the case of a DS3 port with no overbooking, a 1000 PVC connection limit would result in an average rate of 36 Kbps per PVC (36 MHZ of payload bandwidth divided by 1000 PVCs). If PVCs actually average 18 Kbps, port bandwidth would only be 50 percent utilized. The remainder would be wasted.

Further growth of frame relay services, for example, is constrained by a number of factors including platform element connection count limits as discussed above and associated routing algorithm performance issues. High connection counts impact the performance of frame relay service routing and failure recovery processes. These processes run slower and suffer from more "collisions" as connection counts increase. Without relief from the impact of very high connection counts, multiple independent networks may have to be created, operated and maintained in the near future.

Consequently, there is a need in the art to relax some of the constraints such as connection count limits which threaten the expansion and scaling of frame relay service. Thus, there is an opportunity in the art to improve the efficiency of routing traffic with varying bandwidth requirements and for different customers through an improved interworked network architecture.

SUMMARY OF THE INVENTION

According to the principles of the present invention, there are provided virtual path concentrator nodes deployed, for example, between access nodes and gateway switches of a given interworked network which provide circuit aggregation capability. An interworked network comprises a first network having access nodes and a gateway node and a second network having access nodes and a gateway node coupled to the gateway node of the first network via a network to network interface such that a virtual path concentrator node is coupled between an access node and the gateway node of the first network, the virtual path concentrator node providing for the purpose of creation and loading of virtual path circuits between virtual path concentrator nodes and gateway nodes of the first network. Virtual path identifier assignment at endpoints is provided according to a global assignment process of one or more global VPIs for each destination node as described in copending, concurrently filed U.S. patent application Ser. No. 09/221,856, of P. Nicoll and J. Pedersen for Global Addressing and Identifier Assignment in Inter-Worked Networks, which is incorporated herein by reference as to its entire contents. This global VPI is used by every node in the interworked network for routing including the deployed VPCNs. Either the first or the second networks of the interworked network may be an asynchronous transfer mode network or a frame relay network or a combination of asynchronous transfer mode and frame relay networks.

While there is presented herein an example of two interworked networks (A and B) as the generalized case, using the VPCN for circuit aggregation may also be applied within a single network, for example, either network A or network B, to reduce connection counts and thereby minimize loading upon network routing and failure recovery algorithms. The present invention should not be deemed to be limited in respect to only intereworked networks. The loading reduction in any single network or an interworked network is achieved because a virtual path circuit (VPC) carrying multiple customer virtual channel connections (VCC's) counts as a single circuit from the perspective of network routing and failure recovery algorithms.

In one customer application and assuming two hundred fifty permanent virtual circuits may be handled per customer router port, twelve virtual paths may be created at four frame relay virtual path concentrator nodes according to the present invention to route three thousand permanent virtual circuits over two (provided for diversity) frame relay to asynchronous transfer mode network to network interface ports. Similar arrangements could be used to route an additional three thousand permanent virtual circuits to another of the customer's data centers and so on.

The basic principles of applying loopback for providing virtual path connections and saving connection count may be applied to the design of an interworked network. As will be further described herein, an interworked network may be designed to comprise a central core of virtual path concentrator nodes for providing virtual paths between the nodes with surrounding frame relay and/or asynchronous transfer mode networks taking advantage of the central core for saving connection count. Dramatic improvements in internetwork operating efficiency and maintenance will result from building such a network. Flow control and operations, administration and maintenance loops may be provisioned as end-to-end, customer to VPCN, and VPCN to VPCN (among others) closed loops for traffic congestion signaling and improved maintenance. Other advantages of the present invention will be understood from studying the following detailed description of the drawings.

BRIEF DESCRIPTION OF THE DRAWINGS

FIG. 4 provides a drawing showing the implementation of a loopback arrangement whereby a plurality of permanent virtual circuits (PVCs) may be terminated with a selected common VPI value and subsequently reinserted into the network as a single virtual path connection wherein

FIGS. 6a and 6b provide a specific FR-ATM customer example where a savings in permanent virtual circuit connections may be realized.

FIG. 8(a) provides an overview of a standard ATM UNI cell header format and FIG. 8(b) provides an overview of a standard NNI cell header format.

FIG. 9 provides one suggested way of utilizing the VPI field for defining a global destination identifier, a service platform identifier and a primary/secondary flag in support of assigning VPI values to virtual path concentrator nodes according to the present invention.

FIG. 10 is a table showing an example of VPI coding according to FIG. 9 for primary and secondary ATM and frame relay path routing.

FIG. 11(a) shows a virtual channel connection (VCC) arrangement for frame relay to frame relay and frame relay to ATM transport and FIG. 11(b) shows a virtual path circuit (VPC) arrangement for frame relay to frame relay and frame relay to ATM transport implemented in a Cisco Systems BPX router by way of example.

FIG. 12 provides an overview of one example of a bandwidth profile of a DS3 trunk by way of example including provisioned virtual path circuits and reserve for administration, provisioning and restoration.

DETAILED DESCRIPTION

Figure 2:
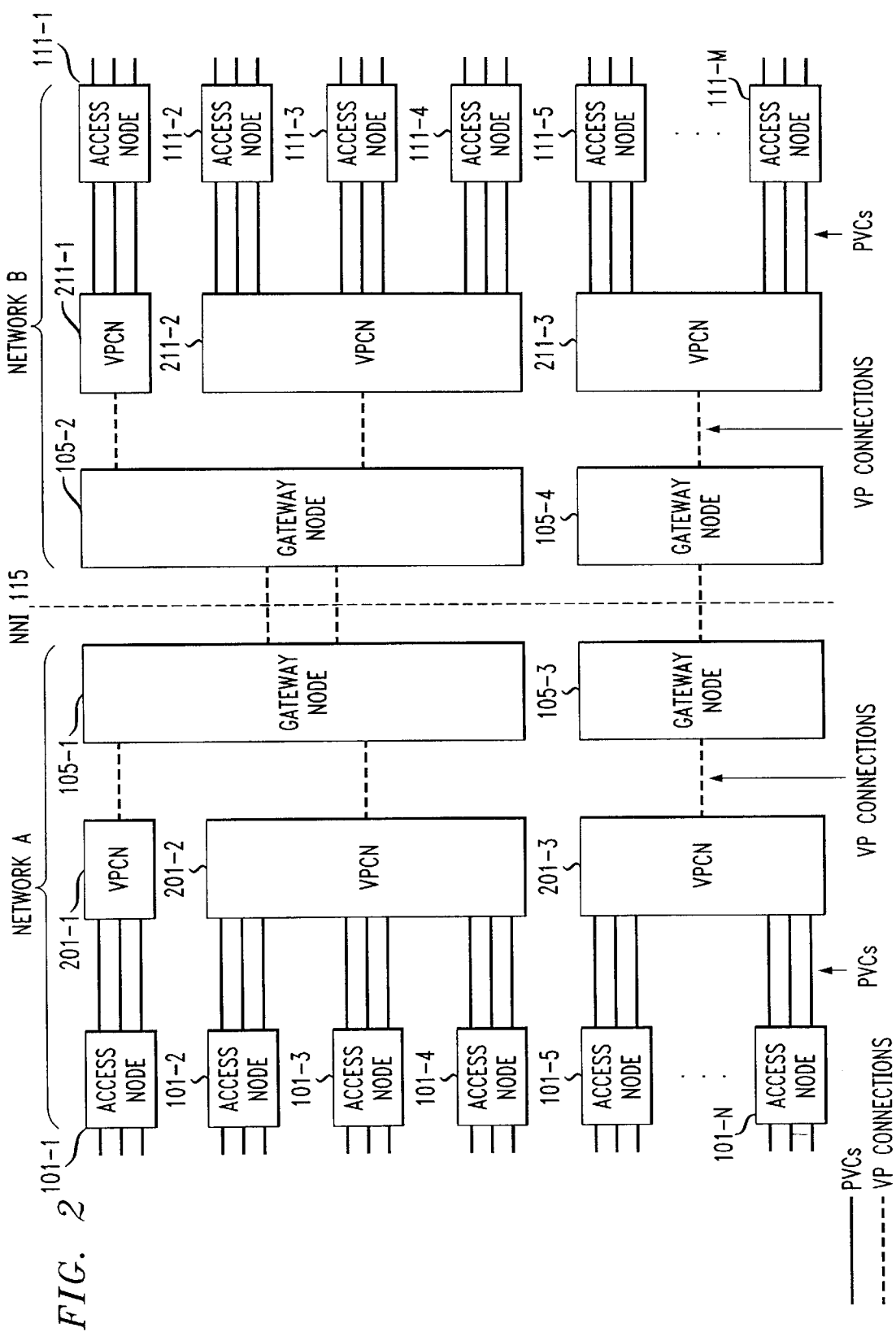
FIG. 2 is a generalized example showing the deployment of a virtual path concentrator node according to the present invention in an interworked network.

FIG. 2 shows a mechanism which will be referred to herein as a virtual path concentrator node (VPCN) for reducing the virtual circuit connection count for a given bandwidth. VPCN's 201-1 to 201-3 and 211-1 to 211-3 are shown in FIG. 2 providing concentration between access switches (AS) and gateway switches (GS). A virtual path concentrator node (VPCN) may employ, for example, only a single virtual path connection for multiple PVCs joined across an network to network interface (NNI).

By convention herein, similar reference numerals will be used throughout for denoting similar elements between drawings. Moreover, the first digit of a reference numeral indicates the figure number where that element first appears. For example, NNI 115 first appears in FIG. 1 and VPCN 201-1 first appears in FIG. 2.

Figure 1:
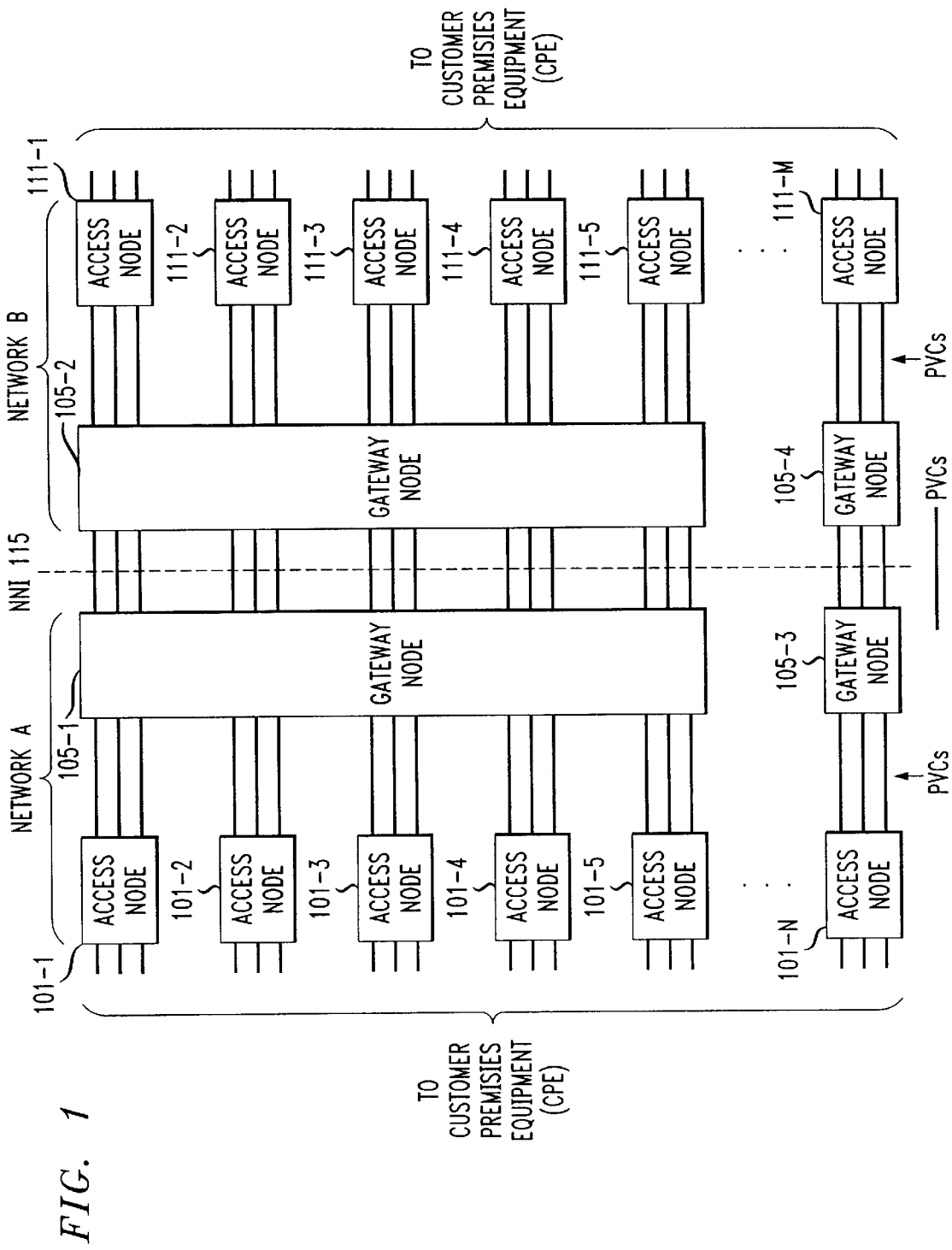
FIG. 1 is a drawing showing a typical way of providing network interworking at a permanent virtual circuit level.

Thus, FIG. 2 depicts a reconfiguration of the nodes of FIG. 1 with new VPCN nodes 201-1 to 201-3 and 211-1 to 211-3 which provide intermediate termination points for PVC segments, shown in solid line by convention. There are three nodes 201-1 to 201-3 shown for Network A and three nodes 211-1 to 211-3 for Network B. The VPCNs are shown providing a single virtual path (VP) connection for three permanent virtual circuits, by way of example. Greater or fewer connection concentration ratios may be achieved depending on customer applications.

FIG. 2 illustrates a generalized case where the two networks A and B may offer non-ATM access protocols and ATM backbone trunking. The access switches (or predecessor access elements) may therefore offer interworking between the access protocol and ATM.

A virtual path (VP), shown in dotted line by convention, exists in an ATM network when only the VPI field of a standard ATM cell is used for routing decisions. A VP connection will carry cells which share a common or global VPI value assigned at the endpoints. The global VPI is further described by copending, concurrently filed U.S. patent application Ser. No. 09/221,856. An example of a global destination identifier (GDI) in the context of VPCN deployment will be discussed herein in conjunction with FIGS. 9 and 10.

The VP connection carries a number of individual PVCs which is equal to the number of unique VCI values found within the cell stream. Since the VCI field is a "don't care" for routing decisions, the variance within that field has no impact upon port resources. All cells share the same VPI and are therefore not distinguishable during cell routing.

The configuration of FIG. 2 assumes that non-ATM access protocol(s) are in use. Thus, the VCI and VPI fields do not exist at network access. Conversion of the access protocol to ATM results in the definition of an ATM endpoint for the first PVC segment at the VPCN ingress point. The next segment of the PVC (between the VPCN and the gateway node) has two ATM endpoints and may therefore be provisioned as a VP. The advantage in concentration and efficiency of using VPs is clearly presented in FIG. 2, where, according to the depicted example, 18 PVCs are routed between networks "A" and "B" within three VP connections. In particular, one pair of NNI ports, 105-1 and 105-2, has used only two VP connections from the available connection count for fifteen PVCs, while the other pair of NNI ports, 105-3 and 105-4, has used only one virtual path connection for an indeterminate number of PVC's (greater than six).

Figure 3:
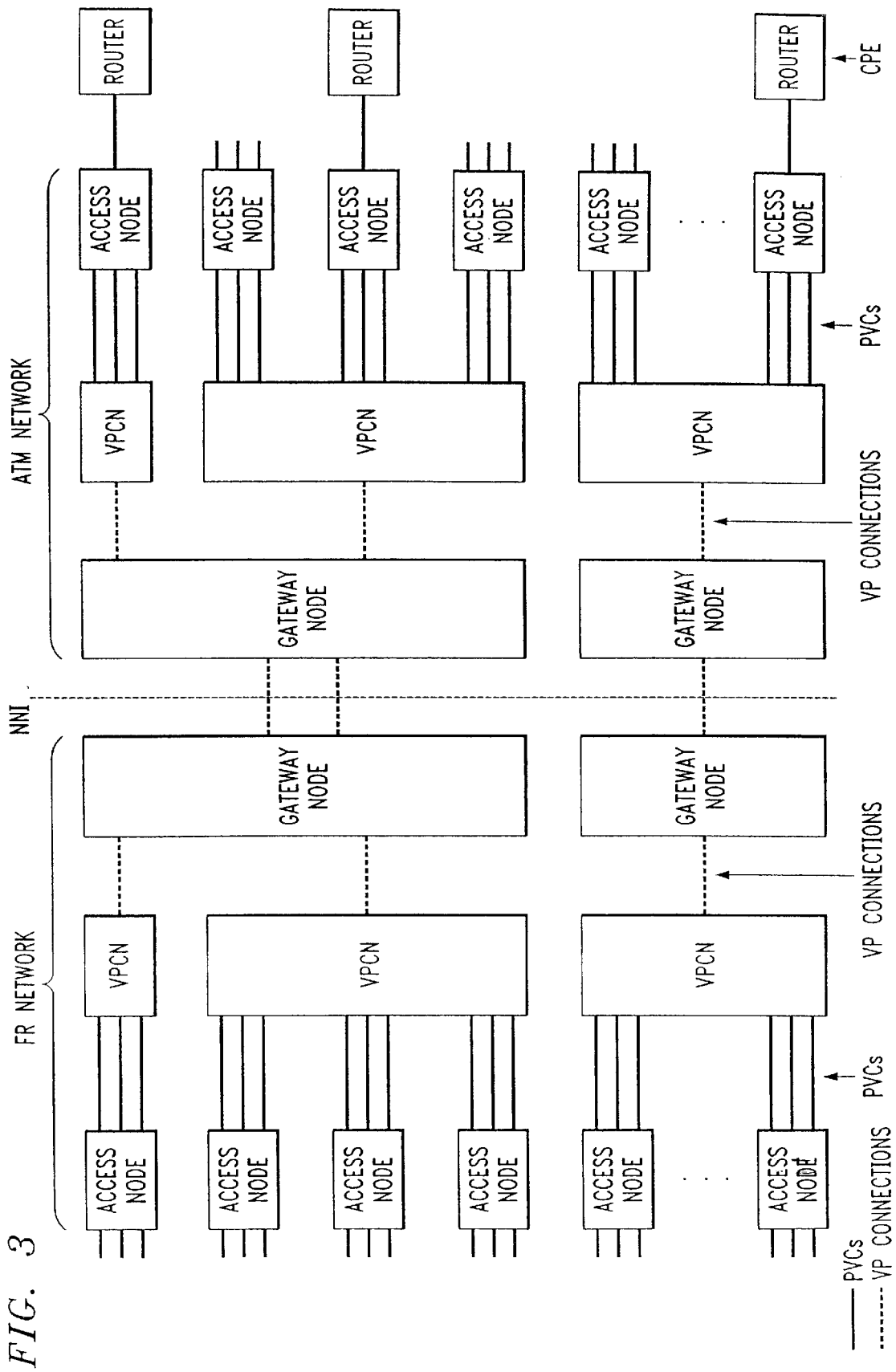
FIG. 3 shows a plurality of customer premises equipment routers (R) connected in an ATM network at access nodes showing frame relay to asynchronous transfer mode network interworking.

FIG. 3 illustrates the application of the general gateway connection count reduction strategy of FIG. 2 to the specific case of FR to ATM network interworking. Network "A," in this example, may represent a Frame Relay Service and Network "B," an ATM Service. Customer router ports (R) are shown to illustrate the benefit of VP switching, namely, that connections terminating on a single router port R may be bundled together with the selection of a common or global VPI. Once the VP connection is formed at the VPCN, the component VCs will be switched together over the VP connection. This type of switching results in and uses only a single VP connection count to achieve the same effect as the VPC configuration of FIG. 1 in terms of bandwidth, and it thus makes extremely efficient use of network connection count resources.

Figure 4A:
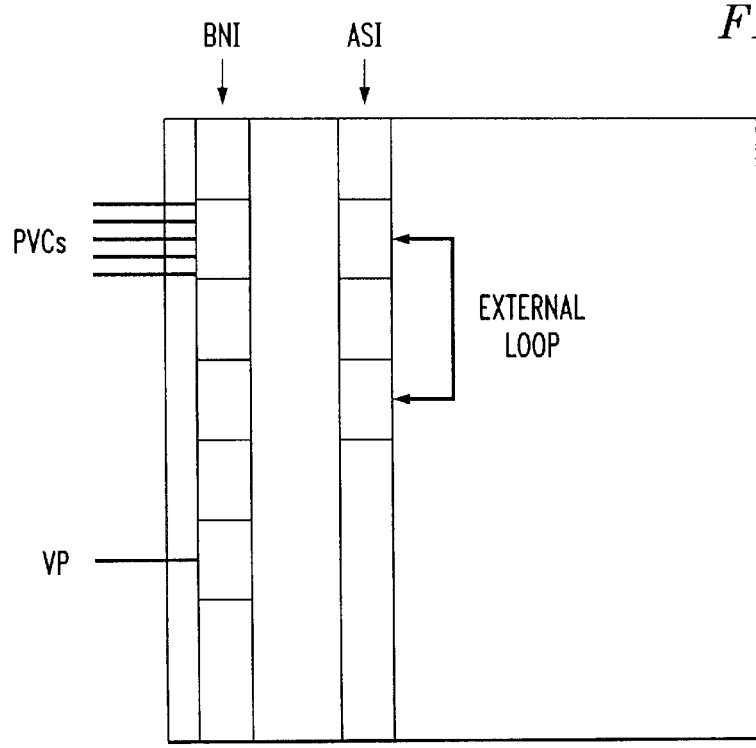
FIG. 4(a) represents such termination in one generation of a Cisco BPX router and FIG. 4(b) represents such termination in another generation of BPX router where the Cisco BPX is but one example of an ATM switch that may serve as a VPCN.
Figure 13:
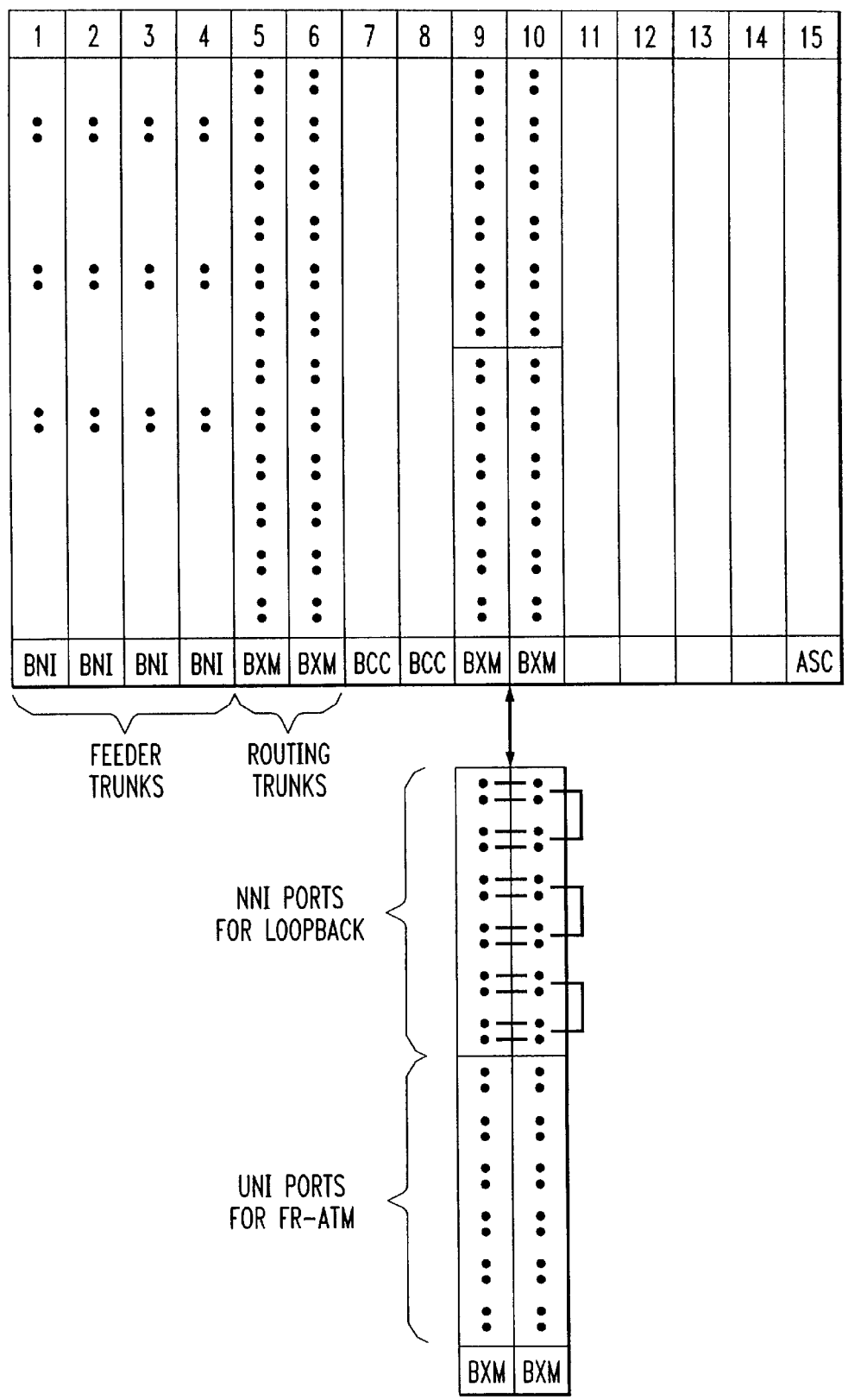
FIG. 13 provides an overview of a shelf of a typical Cisco Systems BPX router by way of example having BXM ports that may be utilized for NNI loopback and UNI ports for frame relay to ATM network interworking.

Referring to FIG. 4, there is shown a Cisco Systems ATM switch known as a BPX switch in block diagram form to show one shelf of the switch, by way of example, to show how a loopback arrangement may be achieved. The Cisco Systems BPX switch is used only by way of example herein. No limitation to the scope of the invention should be considered from the use of the BPX switch by way of example. A loopback may be similarly accomplished in other vendor product such as product available from Lucent Technologies, Inc. The reader may also find it useful to refer briefly to FIG. 13 showing a typical BPX shelf for reference purposes. Referring to FIG. 4(a), in one generation of a Cisco BPX ATM switch, the back card connections for the Cisco BPX ATM switch show one ATM service interface (ASI) card and one BNI card within the BPX shelf For simplicity, five PVCs are depicted in FIG. 4(a) as arriving on a BNI trunk port. The termination point for these five PVCs is the upper ASI port. In order to create the VP, the upper port is looped according to the present invention to the lower ASI port with a physical connection external to the card. In this manner, the lower ASI port becomes the VP origination point. This is necessary so that the terminations on the lower ASI port will have the same, global VPI address assigned at the endpoint. The VP, shown in bold line, is shown riding on another BNI trunk. Thus, the concentration function is implemented by means of the VCC's sharing the same VPI and the VPCN function can be implemented on, for example, an AT&T or now Lucent Technologies GlobeView switch in the same way.

Figure 4B:
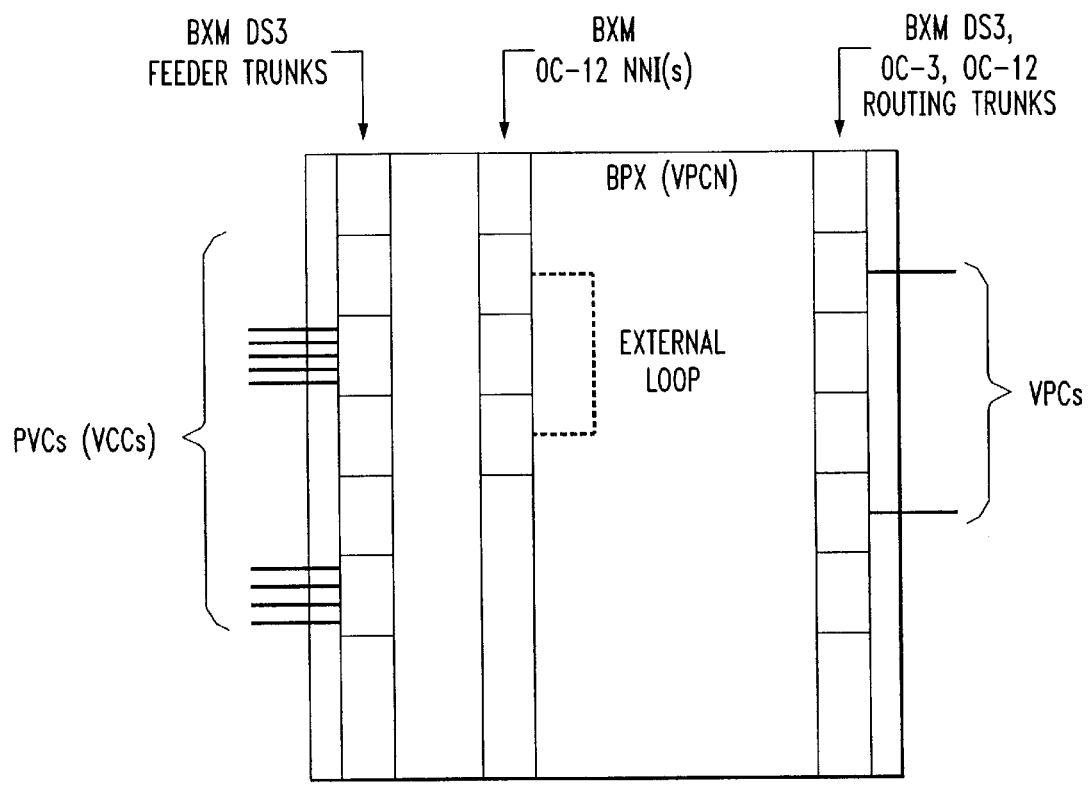

FIG. 4(b) shows yet another implementation of NNI port loopback in a later generation Cisco BPX switch configured as a virtual path concentrator node (VPCN) according to the present invention. A card for terminating BXM DS3 feeder trunks is shown terminating five virtual channel connections (VCCs) at the top along with four PVCs (VCCs) at the bottom. The external loop in dotted lines is shown provided on a card side for BXM OC-12 NNI's. Two virtual path circuits (VPCs) are shown terminated on a card side for BXMDS3, OC-3, OC-12 routing trunks. Referring briefly to FIG. 13, there is shown yet another exemplary depiction of the loopback arrangement.

Figure 5:
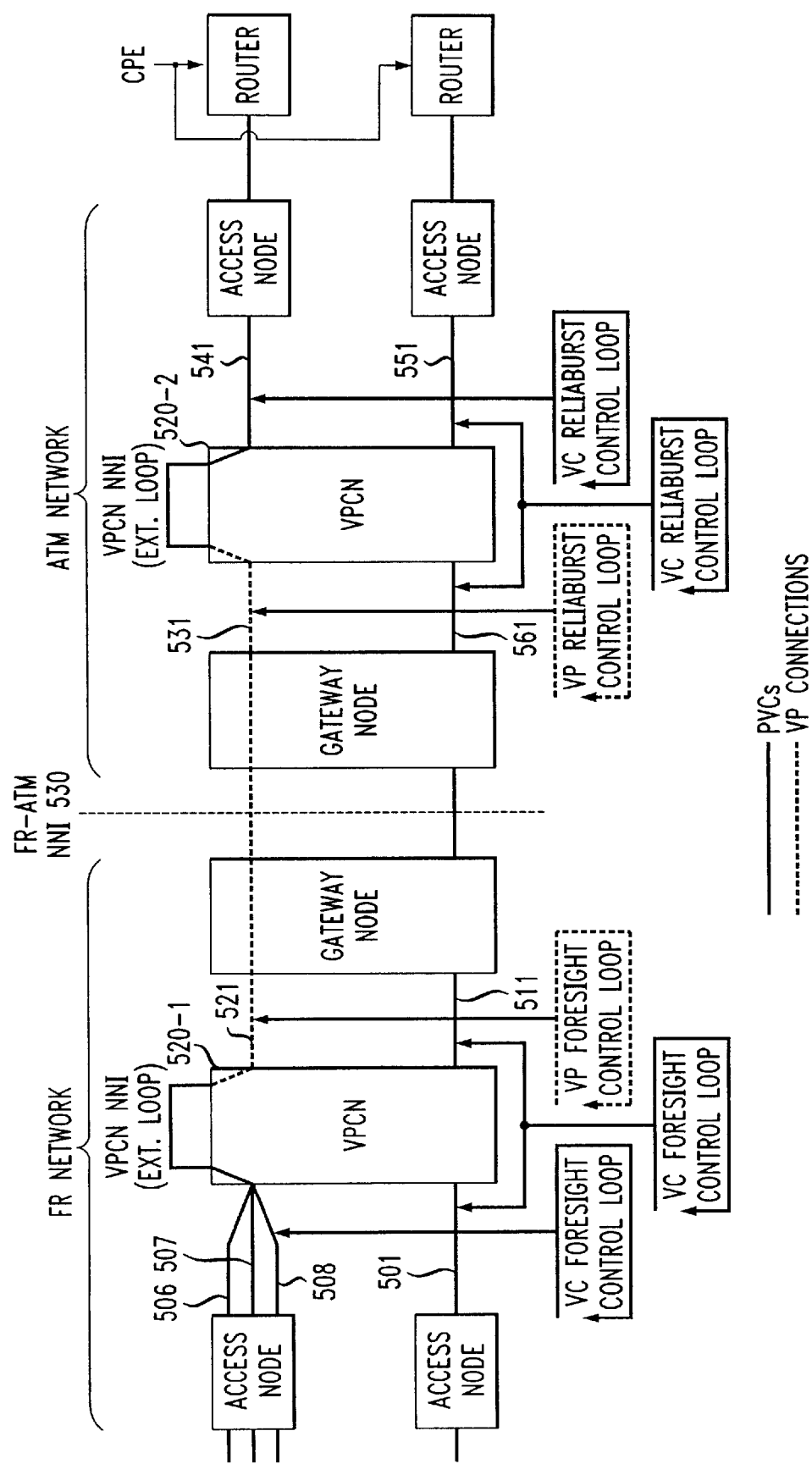
FIG. 5 provides an overview of traffic management functions at a loopback arrangement of FIG. 4 showing the application of closed loop flow control in a frame relay network.

FIG. 5 illustrates VP and VC closed loop flow control loops 501, 506–508, 511, 521, 531, 541, 551, 561, for traffic and congestion control. For example, Cisco Foresight control loops or AT&T ReliaBurst control loops can be set up with VPCN loop termination points. The effect of VPCN deployment is, for example, to break up traffic management control loop 501, 511, 551, 561 into a separate VC control loop 511, 561 and a VP control loop 521, 531 between VPCNs and gateway nodes. A VC control loop 501, 505–508, 541, 551 still exists between the access switch (AS) and the VPCNs. Closed loop flow control rate adjustments will be made on a per VC basis within the VC control loop 501, 506–508, 541, 551. VC level Backward Congestion Messages (BCMs) may be generated at the edges of the loop, the first switch of a network, for passage to CPE, such as router R, and through the VPCN NNI 520-1 for passage to the peer VC Control loop on the other side of the FR-ATM NNI 530, thus facilitating end to end flow control between frame relay network CPE and ATM network CPE.

VP level control loops 521, 531 may exist between the VPCNs, for example, from VPCN 520-1 through the FR-ATM NNI 530 to VPCN 520-2. These loops may operate in a manner which is equivalent to VC level traffic management. Rate adjustments may be made which allocate surplus bandwidth to the VP connection. BCMs can also be generated which would pass congestion notification between peer VP control loops.

VC level control loops, for example, loop 501, 511 are also shown extending from access switches (AS) to the FR-ATM NNI 530. These loops are shown to emphasize the fact that 100% use of VP connectivity is not required. It is expected that some use of VP connectivity will be required in order to implement bundled switching and achieve full bandwidth utilization of NNI ports. VC connectivity can still be used in conjunction with VPs (or alone) in cases where ports are not constrained by connection count.

VC level BCMs may be passed transparently over VP connections. This transfer allows peer VC loops to coordinate rate adjustments over the FR-ATM NNI 530. In order to implement an end-to-end VC level traffic management mechanism, it is necessary to break VPs down to VC level connections within each network. This can be accomplished through the use of both FR and ATM VPCNs. Breakdown to VC level can also be accomplished at customer premises if a BPX or equivalent switching node is available (as appears to be the case for the customer example to be discussed in connection with FIG. 6). In this case, the ATM Service VPCN may not be required.

For maximal overbooking of VP connections, it is necessary for VP level forward and backward congestion indicators to be transferred to all component VCs. This would indeed be the case if a VP level backward congestion message (BM) was interpreted by component VCs as a "broadcast" congestion indicator to which all VCs would respond. Although this type of mechanism is expected to be available within future service implementations, the mechanism is not presently available within known vendor (for example, Cisco Systems/Lucent Technologies) BCM mechanisms as currently deployed. As a result, no VC level traffic management reactions will occur as a result of VP level congestion. This situation does not eliminate the benefits of VP switching but may limit the amount of VP overbooking which can occur. Overbooking may be limited to a level which will prevent VP congestion with a high degree of confidence.

A VCC available bit rate ABR control loop may be provided from left to right of FIG. 5, for example, between AXIS termination points. Control loops are supported by the transport of both path level and channel level RM cells. The RM cells are coupled to VCCs at the VPC/NVCC interfaces.

An unbalanced ABR control loop is also possible comprising a network segment and an external (customer) segment. Such an unbalanced arrangement may be useful if PVCs are provisioned as three separate entities: two local VCC segments and one VPC transport segment. Such a configuration would support the single segment case where one endpoint CPE operates as an ABR source/destination and the other endpoint CPE does not.

Maintenance control loops may be similarly provided for operations, administration and maintenance (OAM) cell flow. A VCC segment OAM flow loop may be provided between the customer and the VPCN or between customer end points. A VPC (between VPCN) OAM flow loop may be provided over the virtual paths.

FIG. 6a illustrates a potential VPCN based solution for an example customer situation which is an ideal candidate for VPCN support due to the very large number of low speed connections which ultimately terminate at a set of customer data center router ports. The example situation is as follows:
6000 FR to ATM PVCs with a committed information rate (CIR) of 16 Kbps.
Two data centers to be served with ATM connectivity.
Two gateways (for example, Dallas and Chicago) will be used for diversity.
Customer has an on premise BPX for interface with a GlobeView switch and router complex Router ports can each handle somewhere between 240 and 300 PVCs each.
Without deployment of VPCNs, this customer would require six ASI cards (12 NNI ports) due to connection count limits. Use of six cards would deplete all service NNI capacity at Dallas and Chicago, as well as two other locations. Actual bandwidth utilization of the cards would only be 10.8% (assuming the ASI ports could potentially have been overbooked at 2:1).
With full bandwidth utilization offered by VPCN deployment according to the present invention and 2:1 port overbooking, this example customer will only require 1.3 NNI ports. With no overbooking (to minimize the likelihood of VP congestion), the customer can still be routed over 2.6 NNI ports. It is expected that overbooking can be safely used with the example above due to the fact that much of the connection count will consist of idle "back-up" PVCs.

FIG. 6a suggests that one VP can be created to service each customer router port. Assuming 250 PVCs per router port, 12 VPs would be created at four FR VPCNs to route 3000 PVCs over two (for diversity) FR to ATM NNIs. A similar arrangement can be deployed to route an additional 3000 PVCs to another data center. If necessary, VCs can be broken out with a VPCN function implemented on the customer BPX. The VPCN could also be implemented on a larger network switch such as the GlobeView "C" switch if traffic management via a BCM option is unavailable on the smaller customer BPX.

Figure 6B:
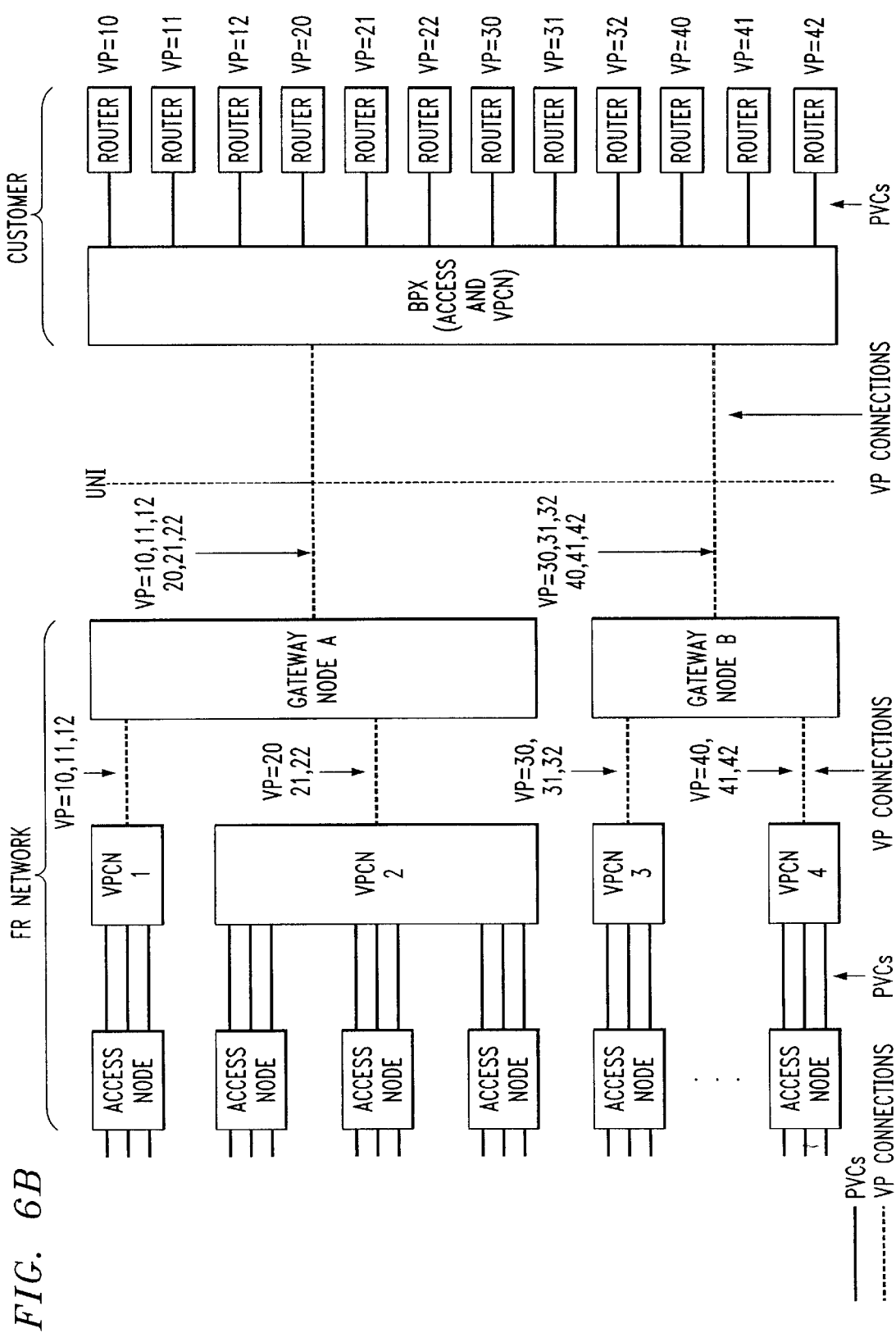

Referring to FIG. 6b, there is shown an equivalent VPCN-based solution for the same customer which bypasses a service provider ATM network altogether. If the customer, for example, has no near term ATM to ATM connectivity requirements for router ports, direct ASI to user network interface (UNI) connection of the customer's BPX to frame relay network gateway nodes or VPCNs may be desirable for additional reliability and performance advantages.

The concept of providing connection savings for a specific customer can be extended to providing improved efficiency in an interworked network including a frame relay network generally. Such a network is designed to include a routing circle of virtual path concentrator nodes which may provide a core of BPX VPC transport segments coupling NNI loopbacks. NNI loopbacks terminating VCC segments, feeder trunks and frame relay AXIS segments are shown in the outer shells of FIG. 6B.

Figure 7:
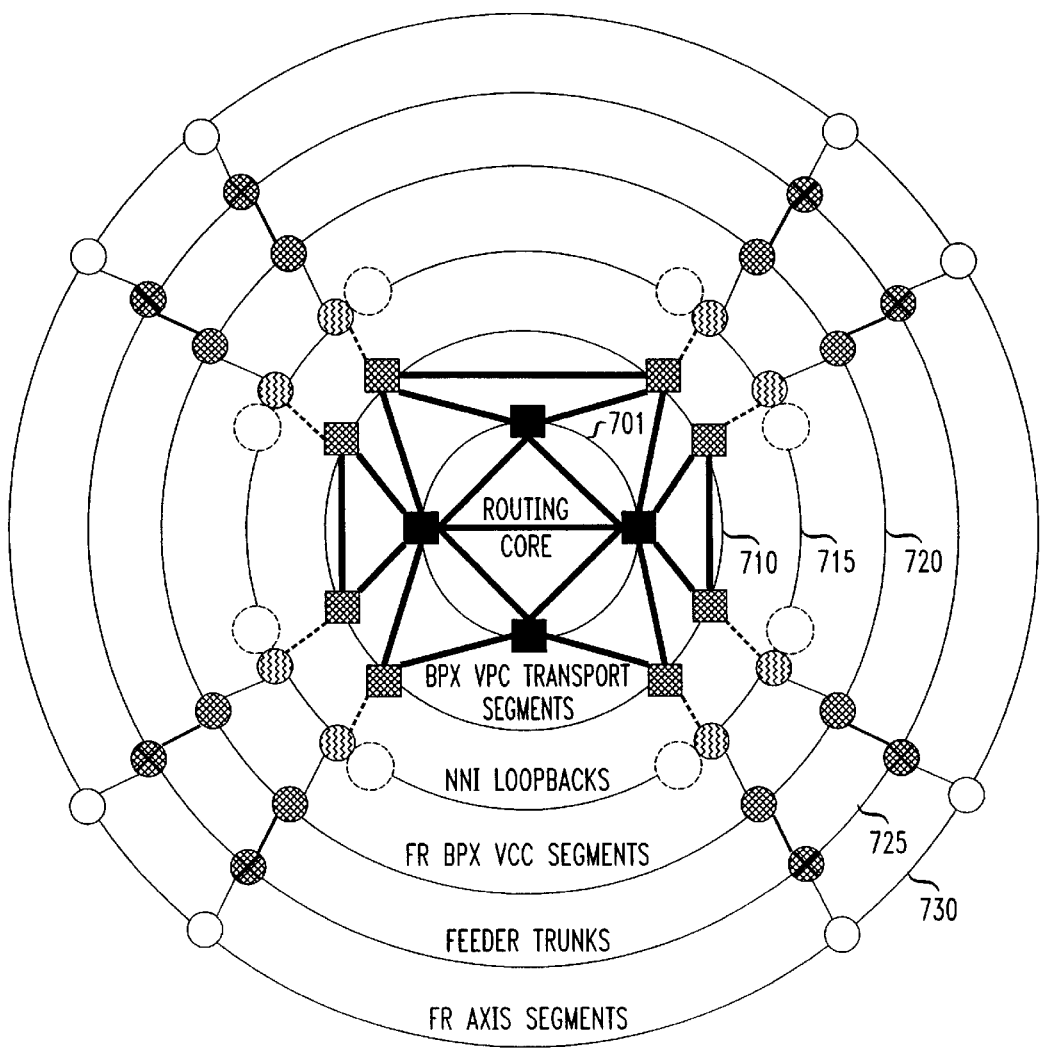
FIG. 7 provides an overview of an exemplary interworked network comprising a central core of virtual path concentrator nodes for generally reducing connection count in a frame relay network.

Referring to FIG. 7, there is shown a drawing of a plurality of concentric circles of such a network design. The inner-most circle 701 represents four ATM core switches forming a routing core of an interworked network. These four ATM core switches carry virtual path circuits according to the present invention. The bold lines connecting the ATM switches within the central core 701 represent physical trunks carrying virtual path circuits (VPCs). At adjacent circle 710, there are shown VPCN routing trunk cards coupled to the next circle 715 of NNI port cards. The dashed connecting lines between circle 710 and 715 represent VPC segments that are internal, for example, to a BPX or other router. The dotted line circles next to each NNI port card represent a physical NNI port loopback. The next circle 720 out from circle 715 represents the termination of VCC segments at feeder trunk cards. Then the feeder trunks are shown, physical trunks carrying VCC's. The solid connecting lines between circle 720 and circle 725 represent the physical trunks carrying VCCs. The small filled circles on the circle 725 represent AXIS/BNM terminations. The outermost shell or circle 730 relates to frame relay AXIS segments.

Such a network design requires implementation and deployment planning. There are different options for building a full mesh connected inner core and allocating resources appropriately to fill in all the outer circles. One may provide such a network on a customer by customer basis or attempt to build the network in such a manner that whenever a new virtual path concentrator node is added to the network, the node is provided with virtual path routing to every other node. Moreover, both strategies may be applied together to build efficient interworked networks.

FIGS. 8a and 8b show the standard ATM UNI and NNI cell headers respectively. The VPI field for NNI is 12 bits in length and for UNI is 8 bits in length. The concepts of global addressing in an interworked environment involving frame relay and ATM cell transport are described in copending concurrently filed U.S. patent application Ser. No. 09/221, 856, entitled "Global Addressing and Identifier Assignment in Inter-Worked Networks" of Peter R. Nicoll and John L. Pedersen. The following discussion extends the discussed concept of global addressing to VPCN deployment planning.

A long field titled GDI for global destination identifier provides for up to 9 bits or up to five hundred twelve possible global destinations within each of the four platform type groups of SPI. Finally, there is shown a primary/secondary (P/S) bit position that may identify one of a redundant pair of global destination VPCNs. Additional redundancy and diversity may be provided by assigning multiple GDI values to VPCNs. The global aspect of the VPI assignment process is provided by the GDI field. This field if defined as suggested provides a nine bit identifier supporting 512 distinct VPC destinations within each of the four service platform groups defined by the SPI field. Other uses of the 12 bit VPI field may include a 10 bit GDI field and a single bit SPI field (for ATM and FR platforms only without reserve capacity). Yet other uses may come to mind consistent with the present invention.

Carrying forward, however, the implementation of a VPI assignment process as suggested by FIG. 9, FIG. 10 provides an example of a coding table for VPI coding of global destination identifier limits for primary and secondary (back-up) paths for ATM and Frame relay platform identification.

In deploying a new VPCN, it may be appropriate to initially provide at least one trunk group between the VPCN and every other VPCN. The number of VPCs required for a full mesh can be calculated as N/2(N-1), where N is the number of VPCNs in the network. For example, if there exist 150 VPCNs, then there may be 11,175 primary and secondary VPCs.

The size of a virtual path circuit has also been studied. In DS3, for example, the physical bandwidth provides for 96,000 cells per second (cps). If over-subscribed at a ratio of 4:1, then the capacity is 384,000 cps providing 2400 64 Kbps sized PVCs. Sizes should be in unit multiples, for example, 2×, 3×, 4×, etc., to minimize the likelihood of blockage during VPC route and re-route events due to granularity effects. The base or minimum size is suggested as 256 Kbps. The base or minimum size should be large enough to avoid an unnecessarily large variety of VPC sizes but not so large such that the minimum allocation used throughout the full mesh is too wasteful.

Size adjustments to VPCs may eventually be automated and usage threshold based (where traffic measurements are kept) or implemented on an appropriate periodic time table of expansion.

Referring to FIG. 11, provisioning of VPCs for PVC aggregation, routing and transport will result in new configurations for customer connections. Existing VCC transport and proposed new VPC transport frame relay to frame relay and frame relay to ATM PVC configurations are shown through a Cisco BPX for example. FIG. 11(a) shows what exists today and FIG. 11(b) shows the VPC transport arrangement conte-mated by the present invention for a customer's BPX.

Referring to FIG. 12, there is shown a bandwidth profile of a DS3 trunk providing frame relay services. The figure emphasizes the point that bandwidth should be specifically reserved for VPC re-route and restoration until physical facility restoration is guaranteed to meet all frame relay service needs. Re-route and restoration bandwidth is segregated and separate from provisioning reserve (unused) bandwidth.

FIG. 13 represents the use of existing BXM ports of a Cisco BPX for virtual path concentration node functions, that is, a service interworking (SIW) gateway function. Specifically FIG. 13 illustrates how SIW nodes can be modified for VPCN functionality using existing spare BXM ports.

Figure 14:
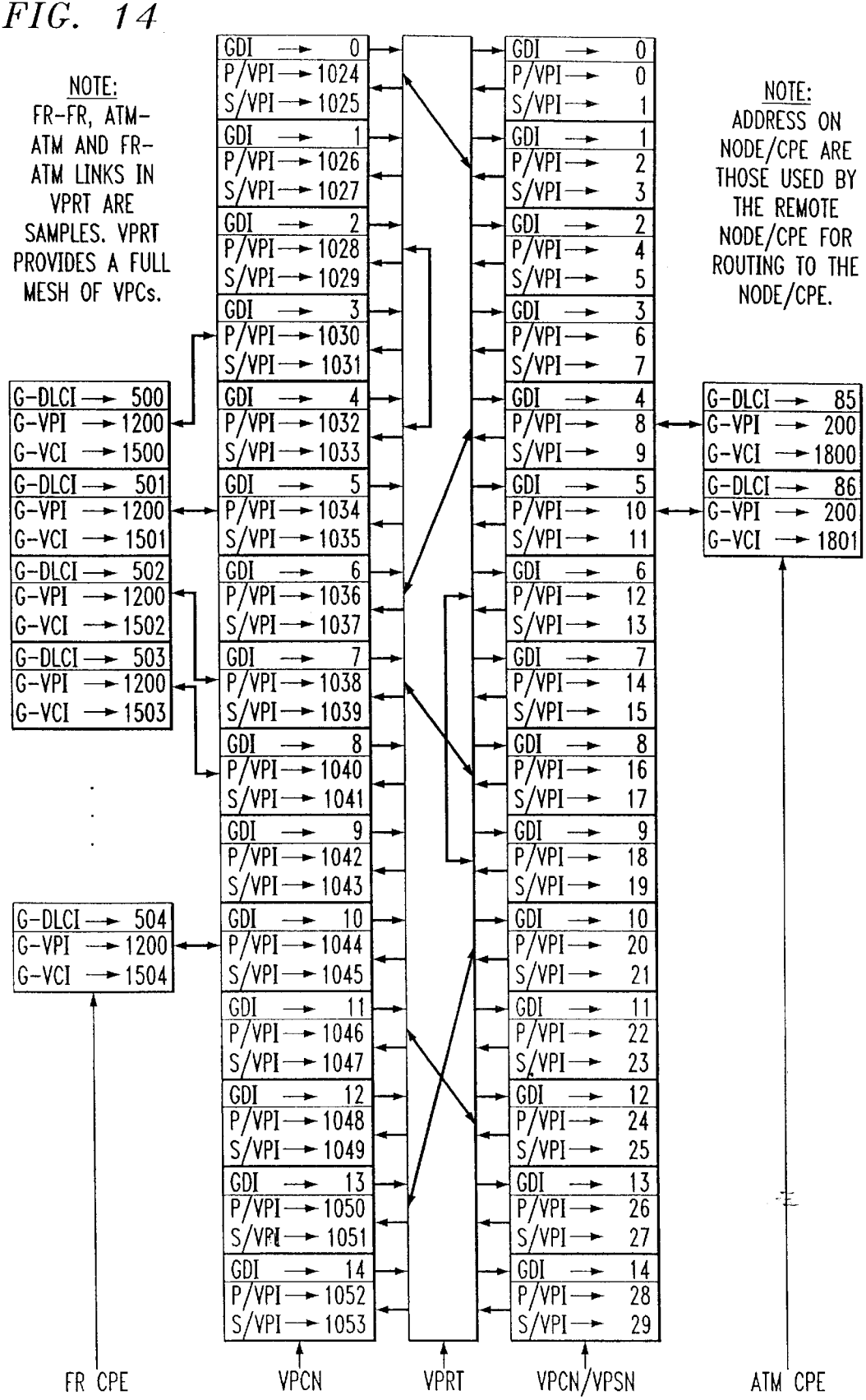
FIG. 14 is a detailed drawing showing a frame relay to ATM virtual path concentrator node with routing assignments according to FIGS. 9 and 10.

Finally, FIG. 14 shows fifteen SIW switches with a full mesh configuration of interconnecting VPCs. (Full connection sets are shown for only three switches to minimize the drawing complexity.) The VPI addressing and assignment process suggested by FIGS. 9 and 10 is utilized in this example. For the frame relay CPE, the reader should note that the FR-FR, ATM-ATM and FR-ATM links in the virtual path routing and transport (VPRT) are samples and that the VPRT provides a full mesh of VPCs. Furthermore, addresses on the node/CPE are those used by the remote node/CPE for routing to the identified node/CPE.

Thus, it has been shown that a deployment of VPCN's according to the present invention and the use of associated virtual path (VP) switching and concentration offers significant advantages in the areas of NNI connection count and bundled switching of customer router traffic. The NNI connection count advantage is realized in cases where average customer PVC size is small enough for connection count limits to be reached before NNI port bandwidth is fully utilized. An overall benefit of VPCN deployment is realized in cases where connection count and bundled switching advantages outweigh the cost of the additional ASI and DS3P port bandwidth used for VPCN implementation.

What I claim is:

1. An interworked network comprising:
    a first network comprising:
        first network access nodes,
        a first network gateway node, and
        a first network concentrator node coupled between the first network access nodes and the first network gateway node; and
    a second network comprising:
        second network access nodes,
        a second network gateway node coupled to the first network gateway node via a network to network interface, and
        a second network concentrator node coupled between the second network access nodes and the second network gateway node,
        each concentrator node having a global address with significance across multiple paths within the first and second networks, the global address being recognized by multiple nodes within both networks and usable for routing without modification thereof,
        multiple virtual circuits being established between the first network access nodes and the first network concentrator node,
        the first network concentrator node being configured to switch data frames received on the multiple virtual circuits and having the global address of the second network concentrator node on a single virtual path connection to the first network gateway node,
        multiple virtual circuits being established between the second network access nodes and the second network concentrator node,
        the second network concentrator node being configured to switch data frames received on the multiple virtual circuits and having the global address of the first network concentrator node on a single virtual path connection to the second network gateway node,
        the gateway nodes being configured to switch data frames having a common global address on a single virtual path connection, thereby concentrating data frames into fewer connections across the network to network interface than would be necessary in the absence of the concentrator nodes, and
        a permanent virtual circuit control loop and a virtual path control loop being established between the at least one concentrator node and the network to network interface for traffic management.

2. An interworked network as recited in claim 1 wherein said first network is an asynchronous transfer mode network and said second network is a frame relay network and routing through the interworked network is provided via a virtual path identifier of an asynchronous transfer mode cell.

3. An interworked network as recited in claim 1 wherein said first network is a frame relay network and said second network is an asynchronous transfer mode network and a forward congestion message is prepared at an edge of said frame relay network.

4. An interworked network as recited in claim 1 comprising a full mesh of concentrator nodes.

5. An interworked network as recited in claim 1 wherein said global address comprises a platform identifier for identifying the platform type as one of frame relay and asynchronous transfer mode and a destination node address.

6. An interworked network as recited in claim 5 wherein said global address further comprises a primary/secondary path flag.

7. An interworked network as recited in claim 5 wherein said platform identifier comprises one of one or two bits and said destination node address comprises one of nine or ten bits.

8. An interworked network as recited in claim 1 wherein a virtual path connection is provided via a loopback arrangement.

9. An interworked network as recited in claim 1 wherein each virtual path is sized in unit multiples.

10. An interworked network as recited in claim 1 wherein a minimum virtual path is 256 Kbps.

11. An interworked network as recited in claim 1 wherein restoration, administrative and provisioning reserve are provided for a trunk for virtual path re-route and restoration.

12. A method of reducing connection count between gateway nodes of first and second networks communicating across a network to network interface, comprising the steps of:

designating a first network concentrator node between multiple first network access nodes and the first network gateway node;

designating a second network concentrator node between multiple second network access nodes and the second network gateway node;

assigning a global address to each concentrator node, each global address having significance across multiple nodes of the networks and usable for routing without modification thereof;

concentrating virtual circuit traffic between access nodes and concentrator nodes to virtual path traffic by switching data frames having a common global address on a single virtual path connection; and managing traffic via a permanent virtual circuit control loop and a virtual path control loop between at least one of the concentrator nodes and the network to network interface.

13. A method of reducing connection count as recited in claim 12 wherein said first network is an asynchronous transfer mode network and said second network is a frame relay network and further comprising the step of routing through the interworked network via a global virtual path identifier of an asynchronous transfer mode cell assigned at an endpoint.

14. A method of reducing connection count as recited in claim 12 wherein said first network is a frame relay network and said second network is an asynchronous transfer mode network and comprising the step of preparing a forward congestion message at an edge of said frame relay network.

15. A method of providing a savings in connection count as recited in claim 12 in which each global address comprises a platform identifier portion and a destination identifier portion.

16. A method as recited in claim 12 wherein a virtual path connection is provided via a loopback arrangement.

17. An interworked network comprising:

a first network comprising:
    first network access nodes,
    a first network gateway node, and
    a first network concentrator node coupled between the first network access nodes and the first network gateway node; and a second network comprising:
    second network access nodes,
    a second network gateway node coupled to the first network gateway node via a network to network interface, and
    a second network concentrator node coupled between the second network access nodes and the second network gateway node,
        each concentrator node having a global address with significance across multiple paths within the first and second networks, the global address being recognized by multiple nodes within both networks and usable for routing without modification thereof,
        multiple virtual circuits being established between the first network access nodes and the first network concentrator node,
        the first network concentrator node being configured to switch data frames received on the multiple virtual circuits and having the global address of the second network concentrator node on a single virtual path connection to the first network gateway node,
        multiple virtual circuits being established between the second network access nodes and the second network concentrator node,
        the second network concentrator node being configured to switch data frames received on the multiple virtual circuits and having the global address of the first network concentrator node on a single virtual path connection to the second network gateway node,
        the gateway nodes being configured to switch data frames having a common global address on a single virtual path connection, thereby concentrating data frames into fewer connections across the network to network interface than would be necessary in the absence of the concentrator nodes, and
    a closed loop flow control loop having a permanent virtual connection segment and a virtual path segment being established in at least one of the first and second networks for traffic management.

18. A method of reducing connection count between gateway nodes of first and second networks communicating across a network to network interface, comprising the steps of:

designating a first network concentrator node between multiple first network access nodes and the first network gateway node;

designating a second network concentrator node between multiple second network access nodes and the second network gateway node;

assigning a global address to each concentrator node, each global address having significance across multiple nodes of the networks and usable for routing without modification thereof;

concentrating virtual circuit traffic between access nodes and concentrator nodes to virtual path traffic by switching data frames having a common global address on a single virtual path connection; and managing traffic via a closed loop flow control loop having a permanent virtual connection segment and a virtual path segment.

19. A network concentrator node coupled between access nodes and a gateway node of a first network, the first network in communication with a second network across a network to network interface, the concentrator node comprising:

a global address having significance across multiple paths within the first and second networks and used by multiple nodes within the first and second networks for routing without modification thereof;

multiple virtual circuit connections to the first network access nodes;

a virtual path connection to the first network gateway node; and a permanent virtual circuit control loop and a virtual path control loop between the at least one concentrator node and the network to network interface for traffic management, the network concentrator node configured:

to receive, on the multiple virtual circuits, data frames having a global address of a concentrator node located within the second network, to switch the received data frames on the virtual path connection to the first network gateway node so as to be further switched by the first network gateway node across the network to network interface to the second network concentrator node over a virtual path, and to thereby concentrate data frames into fewer connections across the network to network interface than would be necessary in the absence of the concentrator nodes.

* * * * *